(12) United States Patent
Michishita

(10) Patent No.: US 7,496,296 B2
(45) Date of Patent: Feb. 24, 2009

(54) OPTICAL TRANSMISSION PATH MONITORING SYSTEM, MONITORING APPARATUS THEREFOR AND MONITORING METHOD THEREFOR

(75) Inventor: Yukio Michishita, Tokyo (JP)

(73) Assignee: NEC Corporation, Tokyo (JP)

( * ) Notice: Subject to any disclaimer, the term of this patent is extended or adjusted under 35 U.S.C. 154(b) by 1626 days.

(21) Appl. No.: 09/933,705

(22) Filed: Aug. 22, 2001

(65) Prior Publication Data

US 2002/0044314 A1 Apr. 18, 2002

(30) Foreign Application Priority Data

Aug. 23, 2000 (JP) .............................. 2000-251768

(51) Int. Cl.
*H04B 10/00* (2006.01)
(52) U.S. Cl. ...................... 398/147; 398/160; 398/177; 398/181
(58) Field of Classification Search ................... 398/13, 398/14, 16, 20, 21, 30–37, 140–181
See application file for complete search history.

(56) References Cited

U.S. PATENT DOCUMENTS

| | | | |
|---|---|---|---|
| 5,790,294 A | | 8/1998 | Horiuchi et al. |
| 5,923,453 A | * | 7/1999 | Yoneyama ................. 398/34 |
| 5,926,263 A | | 7/1999 | Lynch et al. |
| 6,301,404 B1 | * | 10/2001 | Yoneyama ................. 385/24 |
| 6,708,004 B1 | * | 3/2004 | Homsey .................... 398/177 |

FOREIGN PATENT DOCUMENTS

| | | |
|---|---|---|
| EP | 0 784 391 A2 | 7/1997 |
| EP | 0 935 356 A2 | 8/1999 |
| GB | 2 314 224 A | 12/1997 |
| JP | 8-181656 | 7/1996 |
| JP | 11-266205 | 9/1999 |
| JP | 2000-31907 | 1/2000 |
| JP | 2000-59306 | 2/2000 |

OTHER PUBLICATIONS

"Characteristics of optically amplified optical fibre submarine cable systems" ITU-T, G.977, Apr. 2000, pp. 1-36.
European Search Report dated Mar. 28, 2003.

* cited by examiner

*Primary Examiner*—Agustin Bello
(74) *Attorney, Agent, or Firm*—McGinn IP Law Group, PLLC

(57) ABSTRACT

Terminal equipment of a wavelength division multiplexing optical transmission system is provided with a monitoring apparatus for monitoring optical transmission paths with an OTDR. For this monitoring, OTDR probe lights of different wavelengths are allocated to optical fibers and optical amplifier-repeaters, which are elements constituting the optical transmission paths. Further, different wavelengths are allocated to OTDR probe lights between the up link and the downlink. Such a wavelength as makes the wavelength dispersion over the optical transmission paths negative (usually the shorter wavelength side than the zero dispersion wavelength of the optical transmission paths) is allocated to the OTDR probe light for optical fiber monitoring, and a wavelength longer than 1550 nm is allocated to the OTDR probe light for optical amplifier-repeater monitoring.

26 Claims, 14 Drawing Sheets

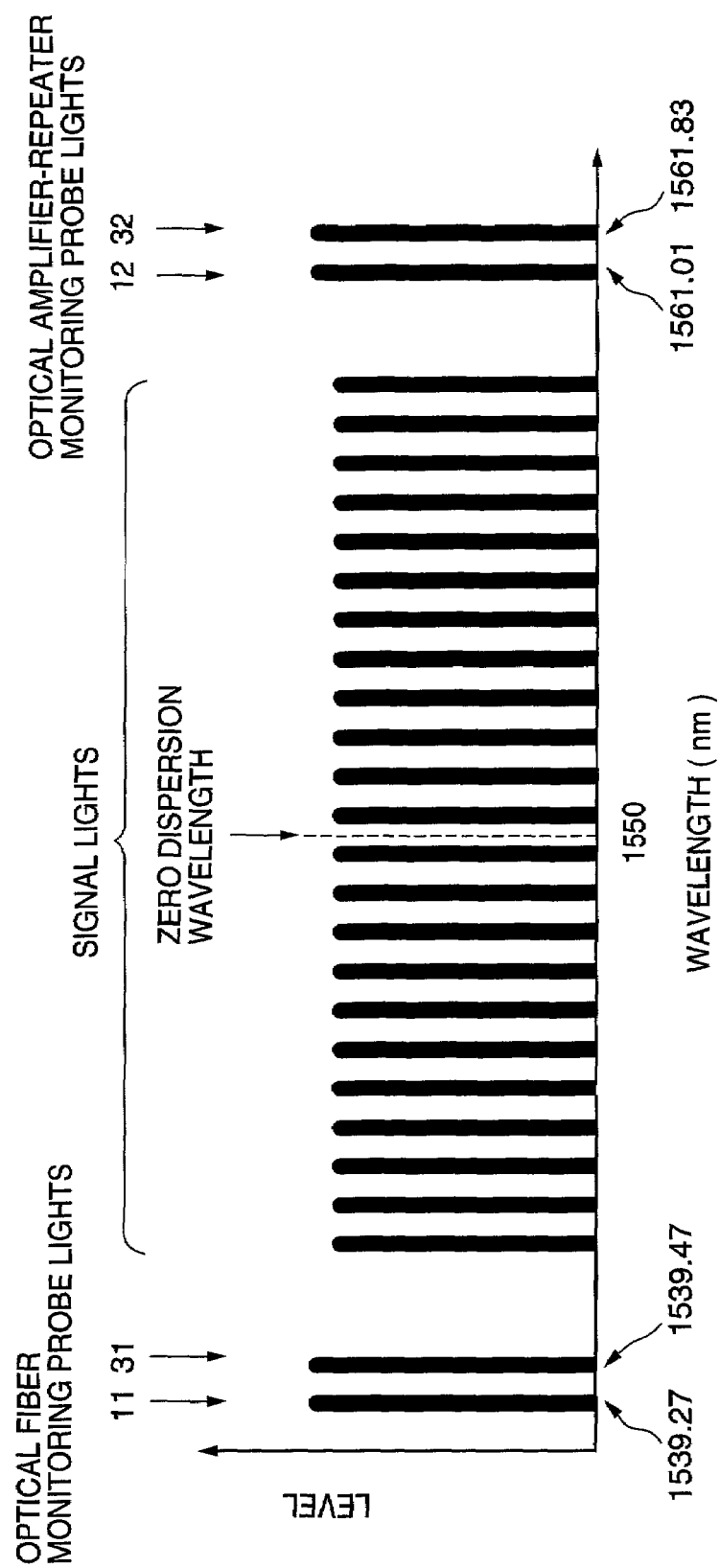

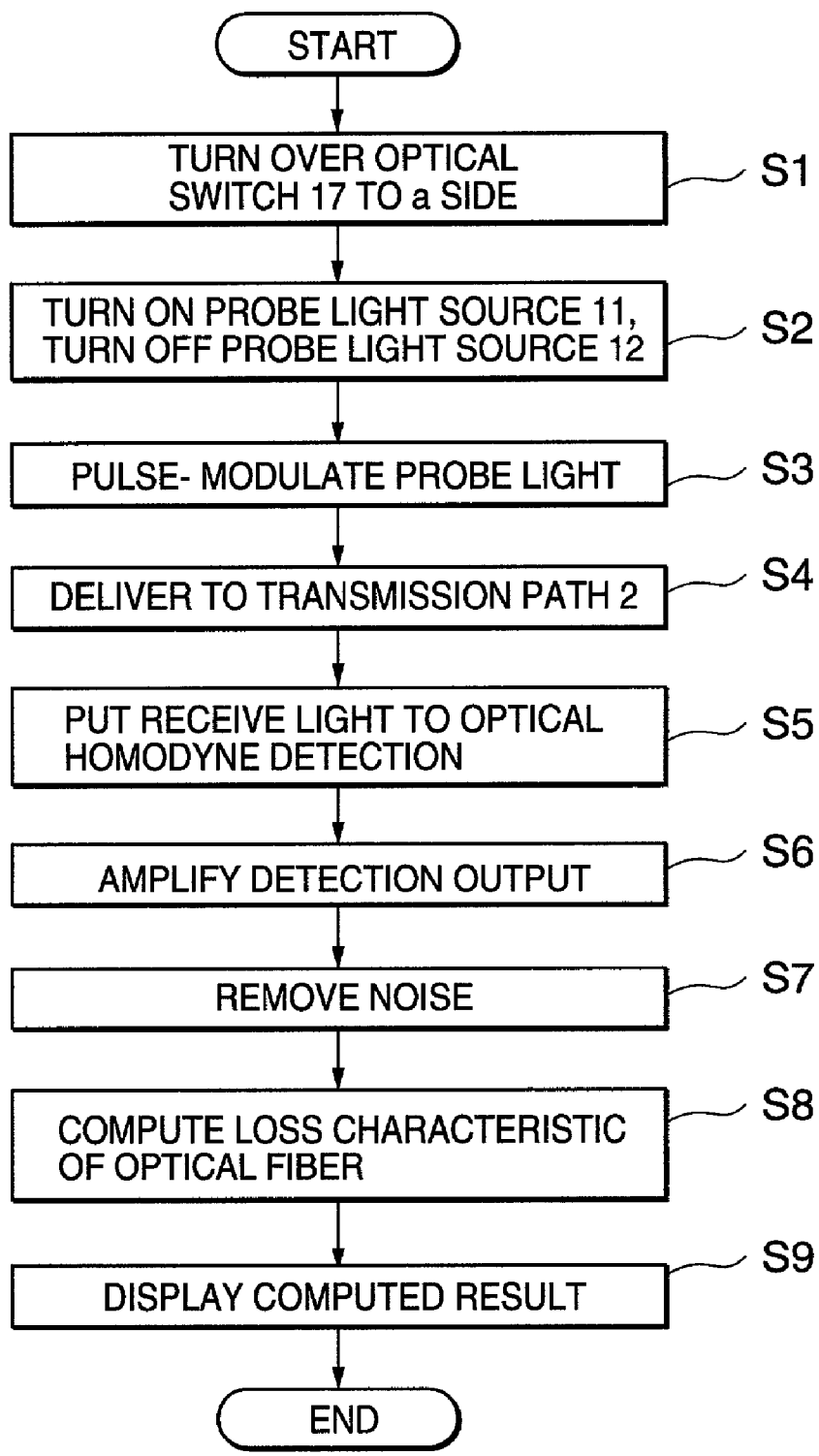

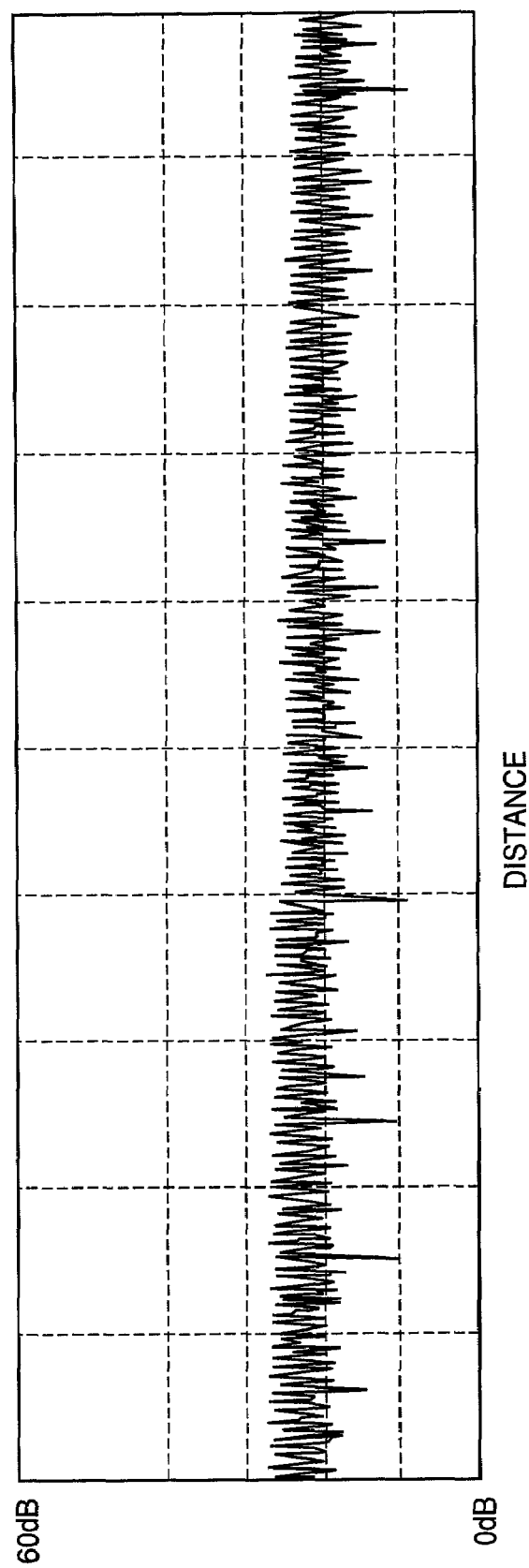

DISTANCE

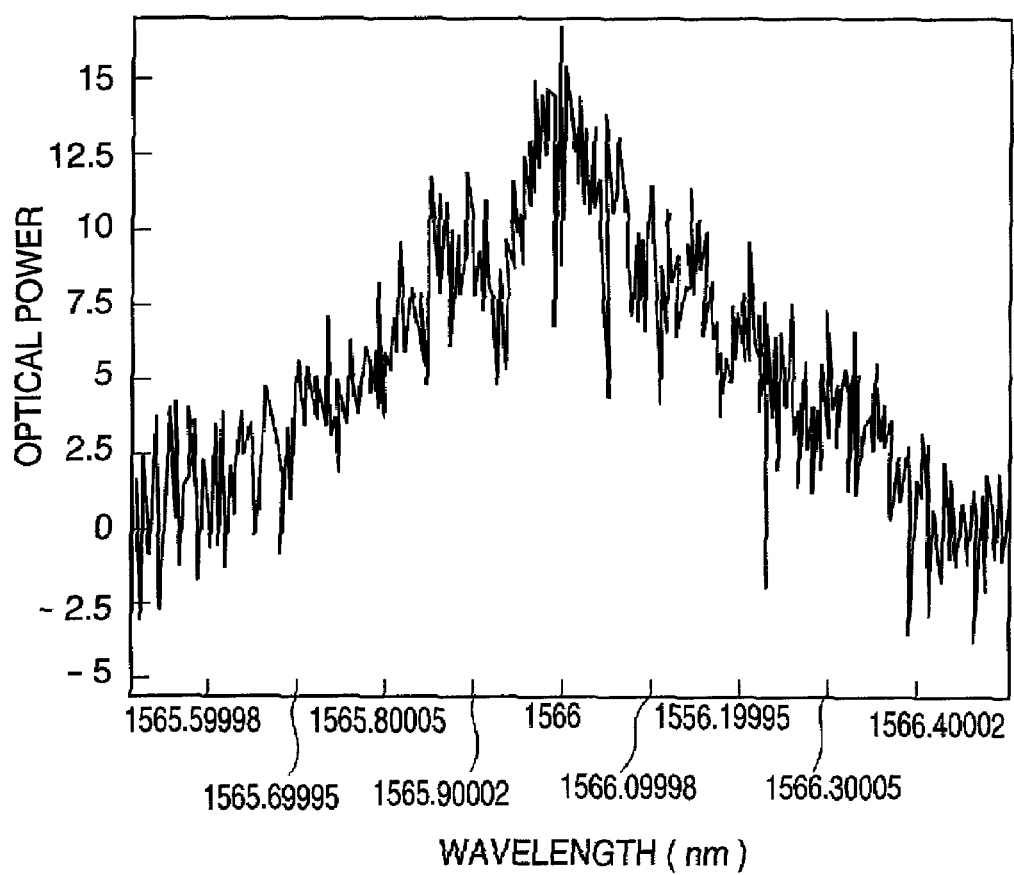

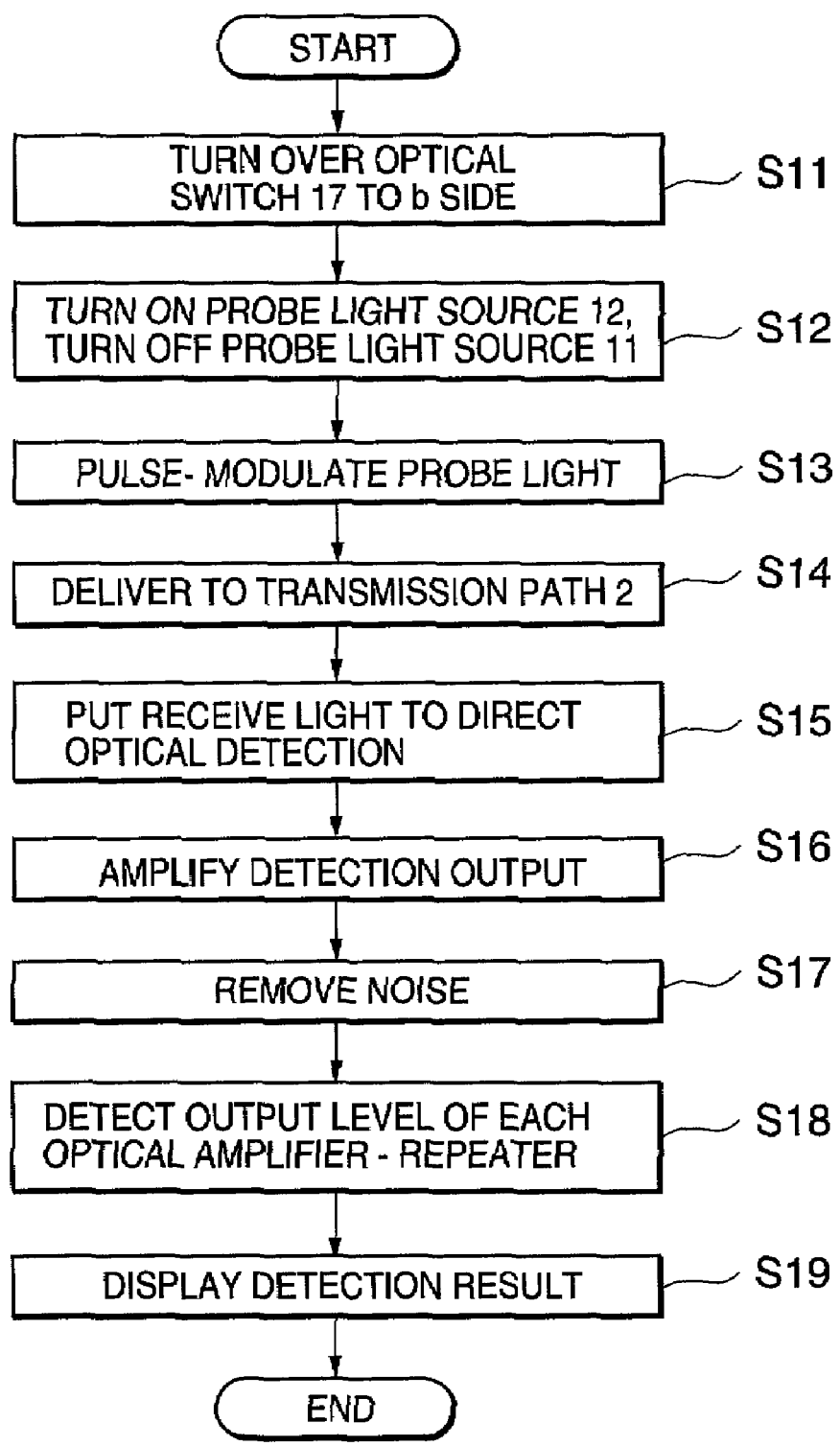

OPTICAL TRANSMISSION PATH MONITORING SYSTEM, MONITORING APPARATUS THEREFOR AND MONITORING METHOD THEREFOR

BACKGROUND OF THE INVENTION

1. Field of the Invention

The present invention relates to an optical transmission path monitoring system, a monitoring apparatus and a monitoring method therefor, and more particularly to a formula of optical transmission path monitoring for monitoring the states of optical fibers and optical amplifier-repeaters constituting optical transmission paths in a wavelength division multiplexing optical transmission system by utilizing an optical time domain reflectometer (OTDR).

2. Description of the Related Prior Art

Today, as a technique of large-capacity long-distance communication, wavelength division multiplexing transmission (WDM transmission) systems using optical amplifier-repeaters have come into practical use extensively. In such a system in actual operation, if any fault arises on an optical transmission path, pinpointing to identify the position and cause of the fault is extremely important for early restoration of the system. The OTDR method by which the intensity and position of reflection of reflected light from midway on the optical transmission path are measured by using an optical pulse is one of the major techniques available for use in fault pinpointing on an optical transmission path.

The ITU-T G. 977 recommendation also refers to the use of a coherent OTDR (COTDR) for use in fault pinpointing in a long-distance optical fiber system. In addition to this recommendation, a number of proposals have been made regarding the monitoring of long-distance WDM optical transmission paths using an OTDR. They include, for instance, the Japanese Patent Applications Laid-Open Nos. 1996-181656, 1999-266205, 2000-31907 and 2000-59306. All the techniques disclosed therein are intended to monitor optical amplifier-repeaters. According to any of these techniques, a transmitting station transmits a monitoring light differing in wavelength from a signal light over a transmission path; the monitoring light is looped back midway on the transmission path to another route in the reverse direction; and the transmitting station simultaneously monitors a plurality of optical amplifier-repeaters by receiving the looped-back monitoring light.

Generally, a long-distance optical transmission path has a configuration in which optical fibers and optical amplifier-repeaters are connected alternately in cascade and in multiple stages. On account of the long distance, it is extremely important for restoration from the faulty state to accurately identify the position and cause of the fault. On the other hand, the optical fibers and the optical amplifier-repeaters, which constitute the optical transmission path, differ in light transmission characteristics. For this reason, in order to monitor an optical transmission path and identify the position and cause of any fault that may arise, the two types of constituent elements, optical fibers and optical amplifier-repeaters, should be differentiated from each other and efficiently monitored without having to take much trouble. Any of the above-cited examples of the prior art merely proposes optical transmission path monitoring by which either only optical amplifiers are mainly monitored or optical fibers and optical amplifier-repeaters are collectively monitored as an optical transmission path without strictly differentiating them.

SUMMARY OF THE INVENTION

An object of the present invention, therefore, is to provide an optical transmission path monitoring system, a monitoring apparatus therefor and a monitoring method there for which make possible effective monitoring of optical fibers and optical amplifier-repeaters by using OTDR probe lights which differ from each other in wavelength, with the light transmission characteristics of the optical fibers and the optical amplifier-repeaters taken into consideration.

Another object of the invention is to provide an optical transmission path monitoring system, a monitoring apparatus therefor and a monitoring method therefor capable of effectively monitoring optical fibers and optical amplifier-repeaters in a so-called in-service state, in which signal lights are present, without affecting the signal lights.

An optical transmission path monitoring system for monitoring optical transmission paths by wavelength-division multiplexing probe lights with signal lights of a wavelength division multiplexing optical transmission system according to the invention is provided with an optical fiber monitoring probe light for monitoring optical fibers which constitute some parts of the optical transmission paths and an optical amplifier-repeater monitoring probe light for monitoring optical amplifier-repeaters which constitute other parts of the optical transmission paths. Such a wavelength, where the wavelength dispersion over the full length of the optical transmission paths is negative, is allocated to the probe light for monitoring optical fibers which constitute some parts of optical transmission paths, and such a wavelength, where the wavelength dispersion over the full length of the optical transmission paths is positive, is allocated to the probe light for amplifier-repeaters which constitute other parts of the optical transmission path. A wavelength on the shorter wavelength side than the zero dispersion wavelength of over the full length of the optical transmission paths is allocated to the optical fiber monitoring probe light, and a wavelength on the longer wavelength side is allocated to the optical amplifier-repeater monitoring probe light.

The optical transmission paths consist of optical fibers and optical amplifier-repeaters connected in cascade and in multiple stages, and the wavelength division multiplexing optical transmission system is a two-core two-way optical transmission system. The wavelength allocated to each probe light differs between the EAST and WEST sides. Monitoring information generated by probe lights sent from the EAST side is extracted at the output end of the optical amplifier-repeaters on the outward optical transmission path, made confluent with the inward optical transmission path at the output end of the optical amplifier-repeaters on the inward optical transmission path, and looped back to the EAST side.

The optical fiber monitoring probe light generates in the optical fibers Rayleigh back-scattering light intensity as monitoring information, and the optical amplifier-repeater monitoring probe light generates the output level of the optical amplifier-repeaters as monitoring information. The extraction of monitoring information is accomplished by an optical coupler and a reflector which selectively reflects the wavelength of the optical amplifier-repeater monitoring probe light. Looped-back monitoring information is detected on the EAST side. A monitoring signal light from the optical fiber monitoring probe light is detected by an optical homodyne detection system, and a monitoring signal light from the optical amplifier-repeater monitoring probe light is detected by a direct detection system.

The respective monitoring probe lights for the optical fibers and the optical amplifier-repeaters are alternatively selected for supply to the optical transmission path, and the optical fibers and the optical amplifier-repeaters are monitored on a time-division basis.

The optical transmission path monitoring system according to the invention is capable of differentiating the optical fibers and the optical amplifier-repeaters, both constituent elements of the optical transmission path, and efficiently monitoring them without having to take much trouble, thereby ensuring the identification of the position and cause of any fault that may arise on the long-distance optical transmission paths.

BRIEF DESCRIPTION OF THE DRAWINGS

The above and other objects, features and advantages of the present invention will become more apparent from the following detailed description when taken in conjunction with of the accompanying drawings in which:

FIG. 5 is a diagram showing the arrangement of signal light wavelengths and probe light wavelengths according to the invention;

FIG. 6 is a flow chart of the optical fiber monitoring operation according to the invention;

FIG. 7A is a diagram showing the result of optical fiber monitoring according to the invention;

FIG. 9B is a diagram showing the result of simulation of a probe light spectrum after transmission where the probe light wavelength is set to such a value as makes the wavelength dispersion over the full length of the optical transmission path positive;

FIG. 10 is a flow chart of the optical amplifier-repeater monitoring operation according to the invention;

DETAILED DESCRIPTION OF THE PREFERRED EMBODIMENTS

Figure 1:
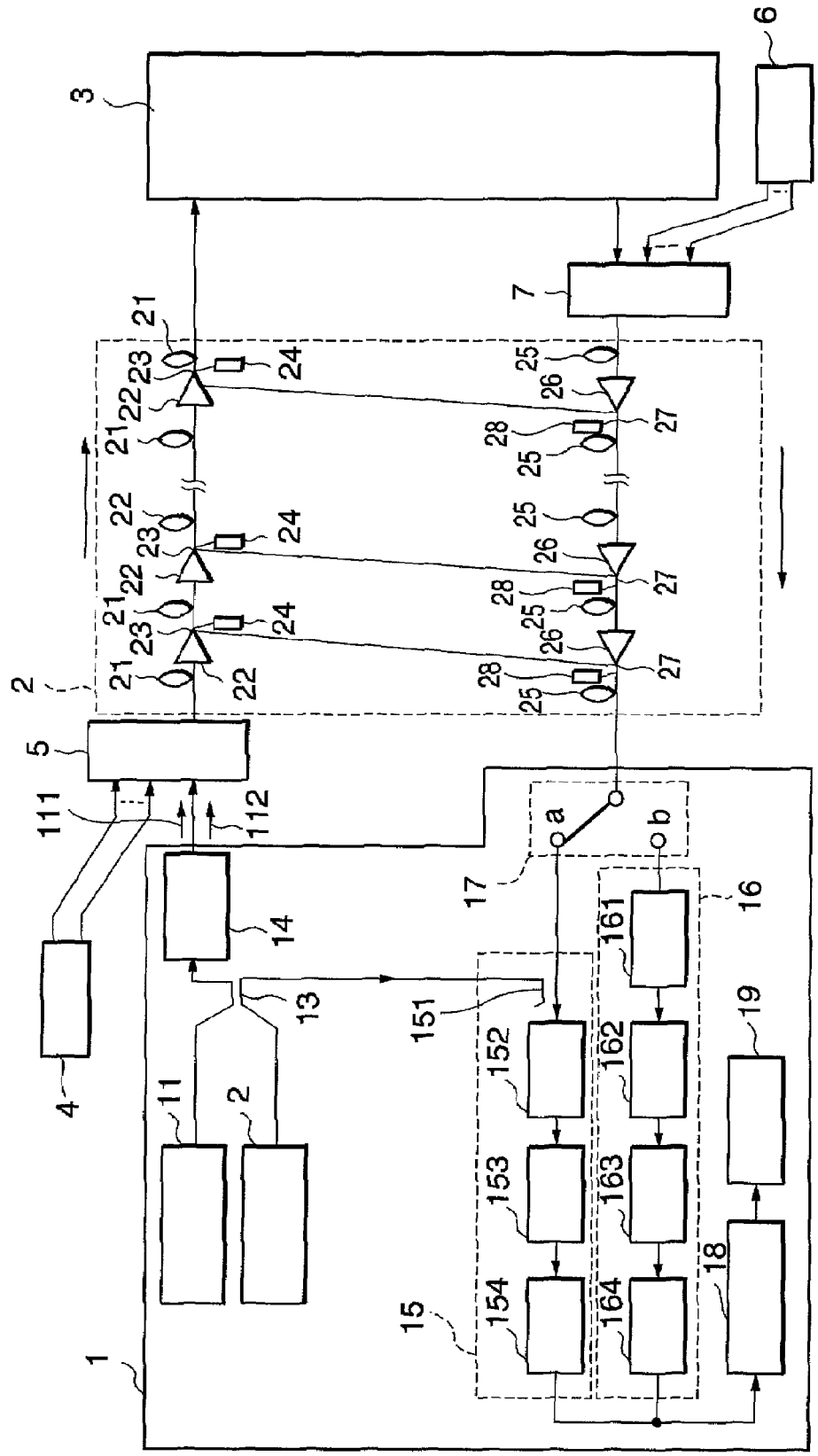
FIG. 1 is a block diagram of an optical transmission path monitoring system according to the invention.

Referring to FIG. 1, an optical transmission path monitoring system according to the present invention comprises an optical transmission path monitoring apparatus 1 for the up link; optical transmission paths 2 having up and down links; an optical transmission path monitoring apparatus 3 for the down link; a signal light source 4 having a plurality of different wavelengths for the up link; a wavelength division multiplexer 5 for wavelength-division multiplexing signal lights from this light source 4 and an optical fiber monitoring probe light 111 or an optical amplifier-repeater monitoring probe light 112 from the optical transmission path monitoring apparatus 1 for the up link; a signal light source 6 having a plurality of different wavelengths for the down link; and a wavelength division multiplexer 7 for wavelength-division multiplexing signal lights from this signal light sources 6 with an optical fiber monitoring probe light or an optical amplifier-repeater monitoring probe light from the optical transmission path monitoring apparatus 3 for the down link.

The optical transmission path monitoring apparatus 1 for the up link is provided with a transmitter section and a receiver section. The transmitter section is configured of two monitoring probe light sources 11 and 12, an optical fiber coupler 13 for multiplexing lights therefrom and at the same time branching part of them, and an optical modulator 14 for intensity-modulating the multiplexed light. The probe light source 11 is used for monitoring optical fibers, and the probe light 12, for monitoring optical amplifier-repeaters.

The receiver section of the optical transmission path monitoring apparatus 1 is provided with two lines of optical receivers consisting of an optical homodyne detection type optical receiver 15 and a direct detection type optical receiver 16; an optical switch 17 for selecting one or the other of the two lines of optical receivers, which are the destinations of receive lights from the optical transmission paths 2; a signal processing section 18; and a display section 19.

The optical homodyne detection type optical receiver 15 is provided with an optical fiber coupler 151, an optical receiver 152, an electrical amplifier 153, and a low pass filter 154. The branch port of the optical fiber coupler 151 and the branch port of the optical fiber coupler 13 are connected to each other.

The direct detection type optical receiver 16 is provided with a wavelength-variable optical filter 161, an optical receiver 162, an electrical amplifier 163, and a low pass filter 164.

Optical signals from the signal light source 4 having a plurality of different wavelengths and probe lights from the optical transmission path monitoring apparatus 1 are wavelength-division multiplexed by the wavelength division multiplexer 5 and delivered to the up link of the optical transmission paths 2.

Figure 2:
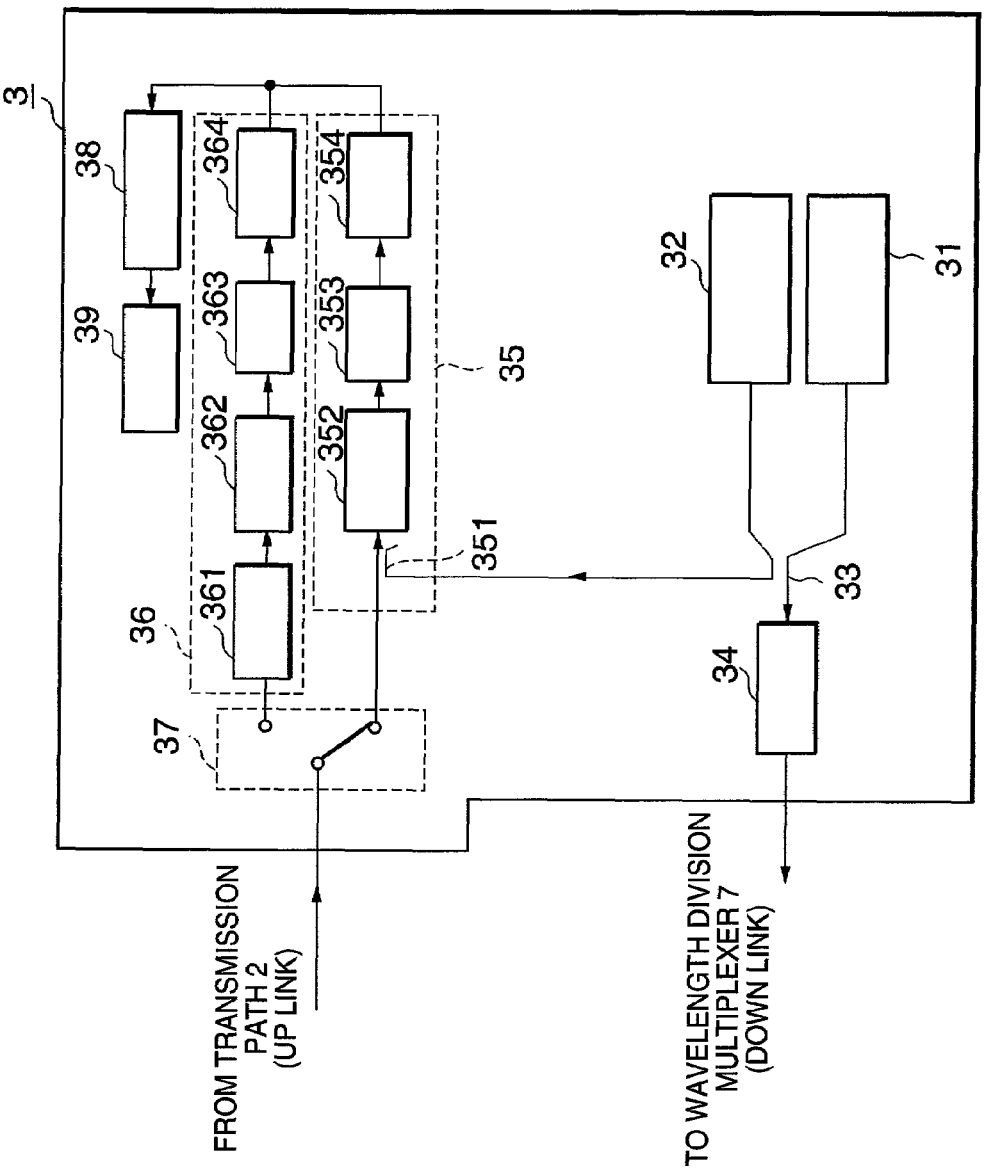
FIG. 2 is a block diagram of an optical transmission path monitoring apparatus for the down link.

The optical transmission path monitoring apparatus 3 for the down link has the same configuration as the optical transmission path monitoring apparatus 1 for the up link. Its configuration is illustrated in FIG. 2.

The transmitter section of the optical transmission path monitoring apparatus 3 for the down link is provided with two OTDR probe light sources 31 and 32, an optical fiber coupler 33 for multiplexing and branching oscillating lights therefrom, and an optical modulator 34 for intensity-modulating the multiplexed lights. The probe light source 31 is used for monitoring optical fibers, and the probe light 32 is used for monitoring optical amplifier-repeaters.

The receiver section of the optical transmission path monitoring apparatus 3 for the down link is provided with two lines of optical receivers consisting of a branch port optical homodyne detection type optical receiver 35 and a direct detection type optical receiver 36, an optical switch 37 for selecting the destination of the receive light from the optical transmission paths 2, a signal processing section 38, and a display section 39.

The optical homodyne detection type optical receiver 35 is provided with an optical fiber coupler 351, an optical receiver 352, an electrical amplifier 353, and a low pass filter 354. The branch port of the optical fiber coupler 351 and the branch port of the optical fiber coupler 33 are connected to each other.

The direct detection type optical receiver 36 is provided with a wavelength-variable optical filter 361, an optical receiver 362, an electrical amplifier 363, and a low pass filter 364.

Optical signals from the signal light source 6 having a plurality of different wavelengths and probe lights from the optical transmission path monitoring apparatus 3 are wavelength-division multiplexed by the wavelength division multiplexer 7, and delivered to the down link of the optical transmission paths 2.

The optical transmission paths 2 are configured of an up link and a down link. To the up link are connected combinations of an optical amplifier-repeater 22 and an optical fiber 21 each in multiple stages in cascade. To the down link are connected combinations of an optical amplifier-repeater 26 and an optical fiber 25 each in multiple stages in cascade similarly to the up link.

To the output sections of the optical amplifier-repeaters 22 and 26 are connected 2×2 optical fiber couplers 23 and 27, respectively, to which parts of the output lights of the optical amplifier-repeater are branched. To one each of the branch ports of the optical fiber couplers 23 and 27 are connected one or the other of wavelength-selective reflecting devices 24 and 28. The reflective center wavelength of the wavelength-selective reflecting device 24 here is identical with the wavelength of the probe light source 12, and the reflective center wavelength of the wavelength-selective reflecting device 28 is identical with the wavelength of the probe light source 32. Further, the other branch port of the optical fiber coupler 23, to which no wavelength-selective reflecting device is connected, and the other branch port of the optical fiber coupler 27, to which no wavelength-selective reflecting device is connected, are connected to each other.

Figure 3:
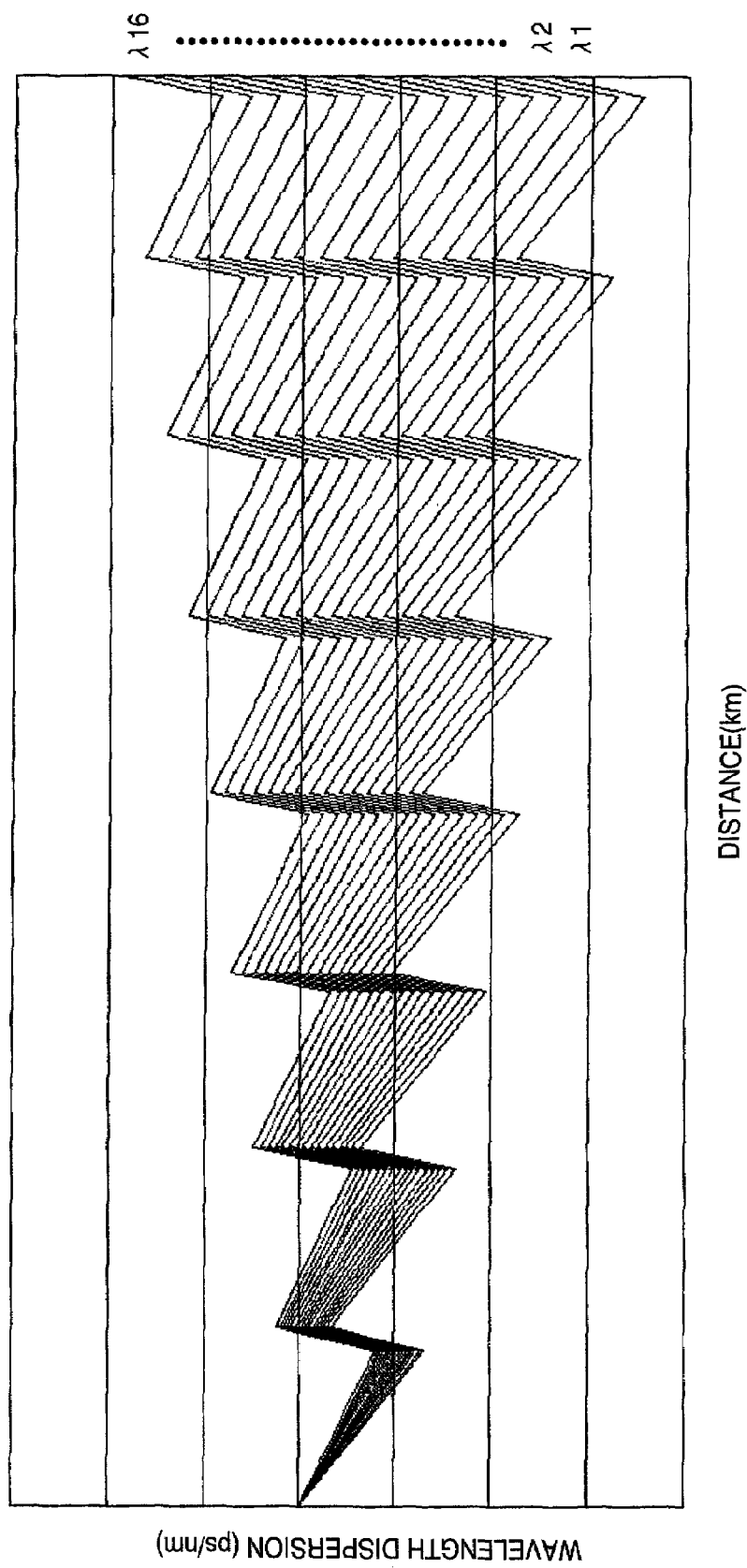
FIG. 3 is a diagram showing group delay wavelength dispersion values relative to the transmission distance over an optical transmission path.

FIG. 3 shows group delay wavelength dispersion values relative to the transmission distance over the optical transmission path 2 with respect to each of 16 signal wavelengths λ1 through λ16. The optical transmission path monitoring system uses non-zero dispersion shift fibers and 1.3 μm zero dispersion fibers for the optical fibers 21 and 25 of the optical transmission paths 2. Their proportions are such that, in each set of 11 transit sections, non-zero dispersion shift fibers are used in 10 transit sections and 1.3 μm zero dispersion fibers are used in 1 transit section. A non-zero dispersion shift fiber (NZ-DSF-) is a dispersion-shifted fiber whose zero dispersion wavelength is shifted slightly toward the longer wavelength side than a 1550 nm zero dispersion-shifted fiber (DSF). It has a primary wavelength dispersion coefficient at 1550 nm of −2 ps/nm/km and a higher-order wavelength dispersion coefficient of 0.07 ps/nm$^2$/km. The 1.3 μm zero dispersion fiber is an ordinary single mode optical fiber (SMF) having a zero dispersion wavelength at 1300 nm, having a primary wavelength dispersion coefficient at 1550 nm of +20 ps/nm/km and a higher-order wavelength dispersion coefficient of 0.05 ps/nm$^2$/km.

Figure 4:
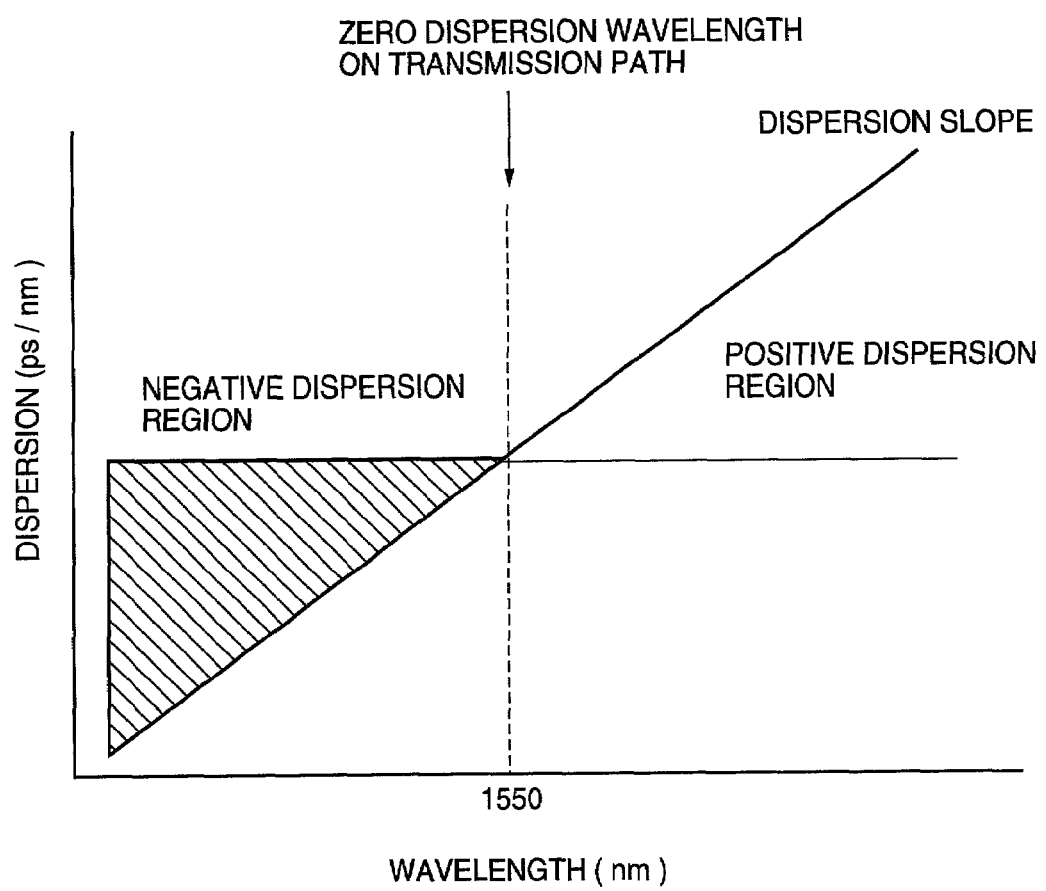
FIG. 4 is a diagram showing group delay wavelength dispersion characteristics over the full length of the optical transmission path.

FIG. 4 shows the wavelength dispersion of group delays over the full length of the optical transmission path 2. The wavelength dispersion is exactly zero at 1550 nm. In this embodiment, the wavelength dispersion value over the full length of the optical transmission path is set to be negative in the wavelength range below 1550 nm and positive in the longer wavelength range.

FIG. 5 shows the arrangement of signal light wavelengths and probe light wavelengths in this embodiment of the invention. The signal light wavelengths are arranged on a wavelength grid according to the ITU-T recommendation at 100 GHz spacing in a range of 1540.16 nm to 1559.79 nm.

The wavelength of the probe light source 11 of the optical transmission path monitoring apparatus 1 for the up link and the wavelength of the probe light source 31 of the optical transmission path monitoring apparatus 3 for the down link are set at 1539.27 nm and 1539.47 nm, shifted by respectively +0.1 nm and −0.1 nm from 1539.37 nm on the wavelength grid according to the ITU-T recommendation. The optical fiber monitoring probe light sources 11 and 31 may be set in the negative wavelength dispersion region (the shadowed part) of FIG. 4, preferably to wavelengths as distant as practicable from the zero dispersion wavelength over the full length of the optical transmission paths within the gain bands of the optical amplifier-repeaters, though there is no particular limitation as to their wavelengths. The spacing between the wavelengths of the two light sources may be at least 0.1 nm.

The wavelength of the optical amplifier-repeater monitoring probe light source 12 is set to 1561.01 nm, and that of the probe light source 32 of the optical amplifier-repeater monitoring, to 1561.83 nm. The probe light sources 12 and 32 may be set to longer wavelengths than 1550 nm, preferably to as long wavelengths as practicable within the gain bands of the optical amplifier-repeaters, though there is no particular limitation as to their wavelengths.

Next will be described the operation of the optical transmission path monitoring apparatus embodying the invention as described above. First, the monitoring of optical fibers will be described with reference to the flow chart of FIG. 6. Where up link optical fibers are to be monitored, the optical switch 17 is turned over to the a side (step S1), the probe light source 11 of the optical transmission path monitoring apparatus 1 is turned on, and the probe light source 12 is turned off (step S2). The light emitted from the probe light source 11 is branched into two beams by the optical fiber coupler 13, of which one is entered into the optical modulator 14 and the other, into the optical homodyne detection type optical receiver 15.

The oscillating light entered into the optical modulator 14 is intensity-modulated into a short pulse to become the probe light 111 (step S3). This probe light 111, after being multiplexed by the wavelength division multiplexer 5 with the signal lights from the signal light source 4 having a plurality of different wavelengths, is delivered to the optical transmission path 2 (step S4). The probe light 111, while undergoing repeated attenuation and amplification by the optical fibers 21 and the optical amplifier-repeaters 22 of the optical transmission path 2, is transmitted. At the optical fiber 21 of each transit span, part of the probe light 111 is reflected toward the transmitting side by the Rayleigh backward-scattering effect. This backward-scattered light is branched and extracted to the optical fiber coupler 23, and delivered to the down link via the optical fiber coupler 27.

The backward-scattered probe light delivered to the down link is entered into the optical transmission path monitoring apparatus 1 after being transmitted over the downward optical transmission path. Further, the backward-scattered probe light is received by the optical homodyne detection type optical receiver 15, which is selected by the optical switch 17. In the optical homodyne detection type optical receiver 15, the backward-scattered probe light is mixed by the optical fiber coupler 151 with an oscillating light branched from the probe light source 11 by the optical fiber coupler 13 of the transmitter section, subjected to square-law detection by the optical receiver 152, and converted into a baseband signal having intensity information on the probe light 111 (step S5).

The photoelectrically converted baseband signal deriving from the backward-scattered probe light is amplified by the electrical amplifier 153 (step S6), and reduced of its noise content by the low pass filter 154 (step S7). Then the signal processing section 18 computes the reflecting position of the probe light 111 on the up link optical transmission path from the arrival time of the homodyne detection signal and the loss characteristic of the optical fiber from the level of the homodyne detection signal (step S8) to be displayed on the display section 19 (step S9). The method of measuring the optical fibers using the probe light 111 is that of the optical time domain reflectometer (OTDR) by a coherent method.

FIG. 7A shows the result of an optical fiber monitoring experiment carried out with the embodiment of the invention at a signal light of 10 Gb/s bit-rate, 40 channels subjected to wavelength-division multiplexing over the full length of an optical transmission path in a system of 8000 km in transmission distance. This experiment was carried out in a state where signal lights were present, i.e. in an in-service state.

Figure 7B:
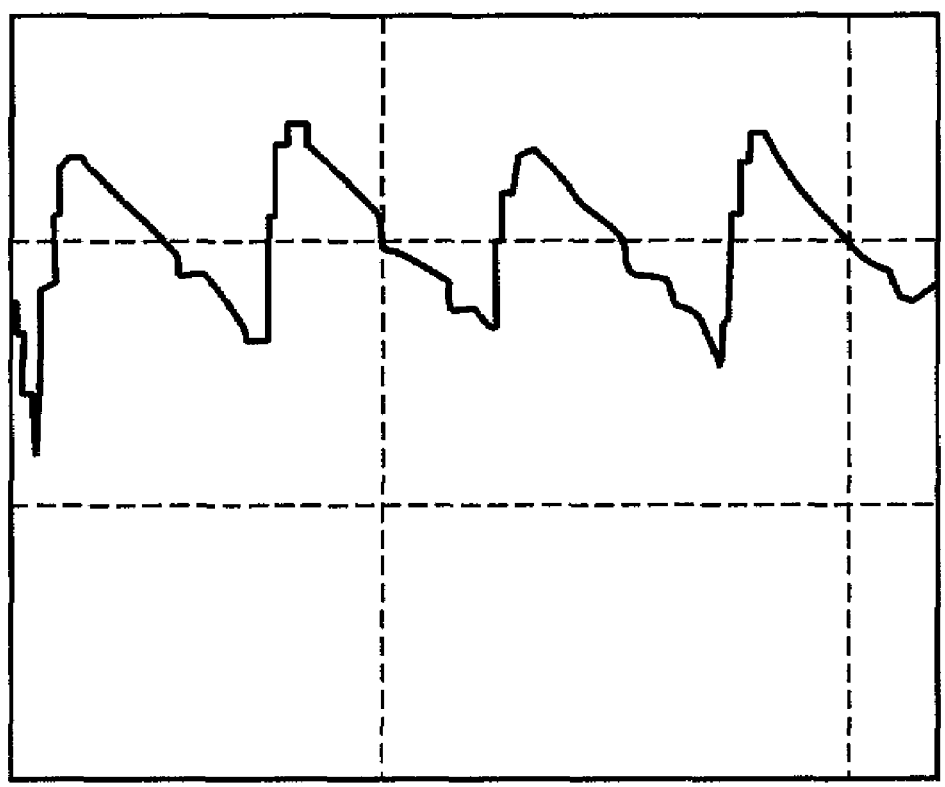
FIG. 7B shows part of FIG. 7A in detail.

FIG. 7B is an expanded view of the part around 8000 km of the result of measurement generally shown in FIG. 7A. In FIG. 7B, where the OTDR trace is sloped, the probe light attenuates with an increase in the distance of propagation in the optical fibers linking the optical amplifier-repeaters, and where the trace steeply rises, the probe light is optically amplified by the optical amplifier-repeaters. This finding reveals that a satisfactory OTDR is observed up to 8000 km, but no peculiar reflection, which could be attributed to an optical fiber rupture of the like, occurs on the way.

Incidentally, the gradual fall of the peak level of the OTDR trace with an increase in the distance of transmission as shown in FIG. 7A is due to a deterioration in the efficiency of optical homodyne detection resulting from the phase noise added to the probe light by the nonlinear optical effect within the optical fibers.

Figure 8:
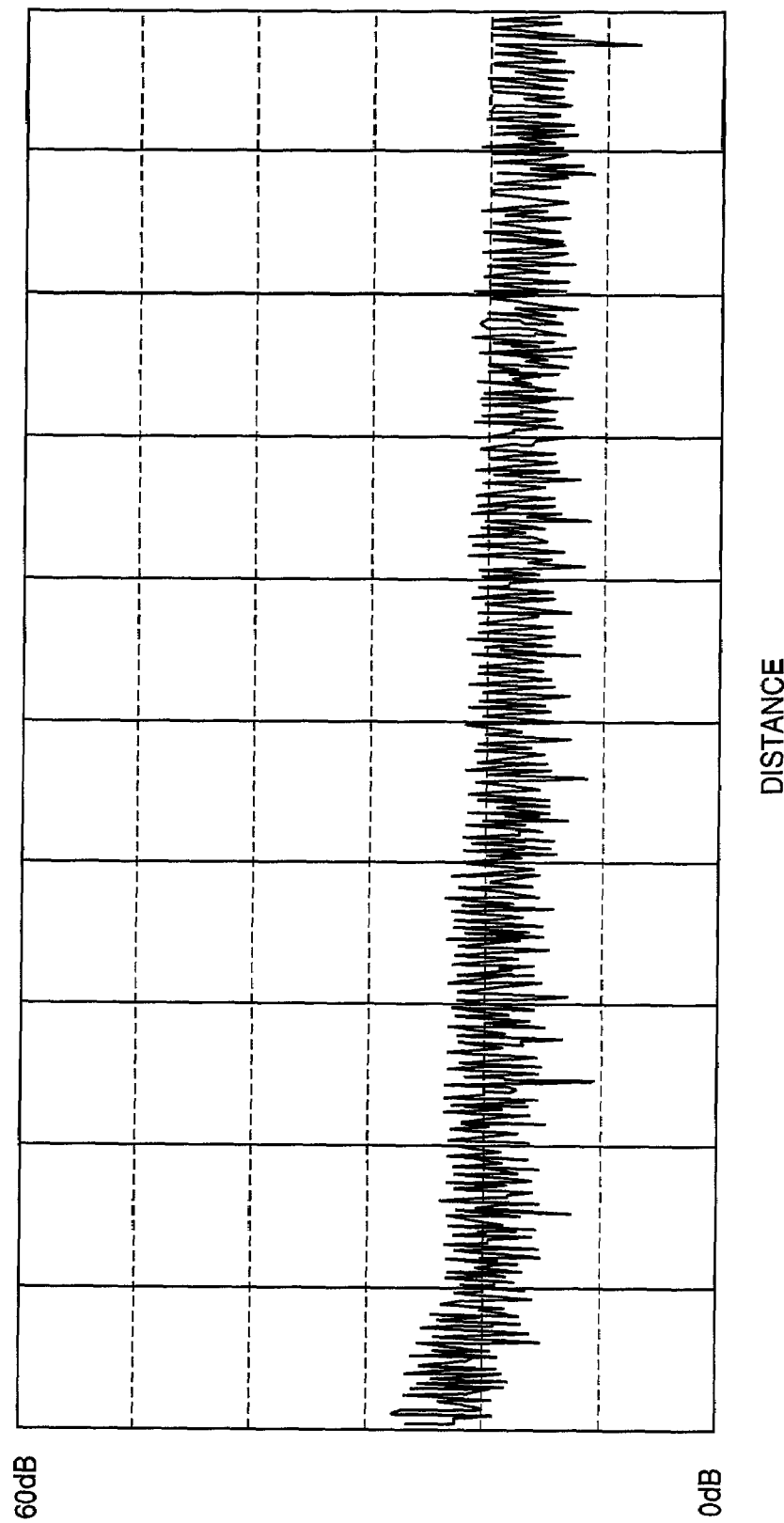
FIG. 8 is a diagram showing the result of optical fiber monitoring according to the prior art.

FIG. 8 shows the result of optical fiber monitoring carried out with no particular consideration as according to the prior art, with the wavelength of the probe light set to 1560 nm in the region where the wavelength dispersion over the full length of an optical transmission path takes on a positive value.

The result illustrated here reveals that the peak level of the OTDR trace steeply falls with an increase in the distance of the optical transmission path, even buried in noise at or above 2000 km. This finding conceivably can be attributed to an increase in deterioration by the nonlinear optical effect in the region where the wavelength dispersion takes on a positive value.

The reason why the optical transmission path distance in which the coherent OTDR is measurable differs depending on the wavelength region in which the probe light wavelength is set can be verified by the following simulation as well.

Figure 9A:
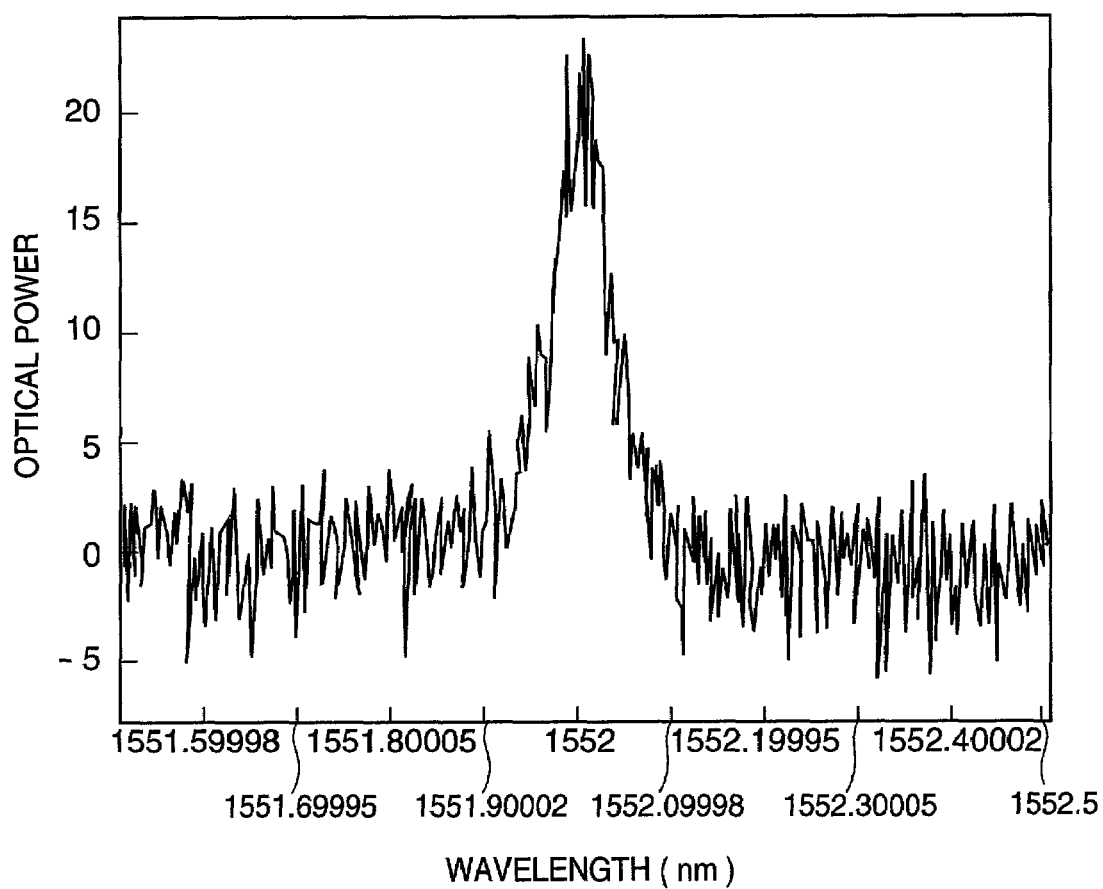
FIG. 9A is a diagram showing the result of simulation of a probe light spectrum after transmission where the probe light wavelength is set to such a value as makes the wavelength dispersion over the full length of the optical transmission path negative.

FIG. 9A shows the result of computer simulation of a probe light spectrum after transmission where the probe light wavelength is set to such a value as makes the wavelength dispersion over the full length of the optical transmission paths negative, while FIG. 9B shows the result of computer simulation of a probe light spectrum after transmission where the probe light wavelength is set to such a value as makes the wavelength dispersion over the full length of the optical transmission paths positive. The distance of transmission is 12000 Km.

These results reveal that, with an increase in the distance of transmission, while the phase noise of the optical spectrum significantly increases where the probe light wavelength is set in a range in which the wavelength dispersion takes on a positive value, the phase noise hardly increases where the probe light wavelength is set in a range in which the wavelength dispersion takes on a negative value. Since this finding is well in agreement with the results shown in FIG. 7A and FIG. 7B cited above, it is seen that setting of the wavelength of the optical fiber monitoring probe light in a negative wavelength dispersion range is evidently effective.

Next will be described the operation of the optical transmission path monitoring apparatus to monitor the optical amplifier-repeaters. The flow chart of FIG. 10 shows the operation of the optical transmission path monitoring apparatus 1 to monitor the up link optical amplifier-repeaters 22 constituting part of the optical transmission path 2.

When the optical amplifier-repeaters are to be monitored, the optical switch 17 is turned to the b side (step S11), the probe light source 11 of the optical transmission path monitoring apparatus 1 is turned off, and the probe light source 12 is turned on (step S12). The oscillating light from the probe light source 12, after being partly branched by the optical fiber coupler 13, is intensity-modulated by the optical modulator 14 into a short pulse to become the probe light 121 (step S13).

This probe light 121, after being multiplexed by the wavelength division multiplexer 5 with signal lights from the signal light source 4 having a plurality of different wavelengths, is delivered to the optical transmission path 2 (step S14). The probe light 121, while undergoing repeated attenuation and amplification by the optical fibers 21 and the optical amplifier-repeaters 22 of the optical transmission path 2, is transmitted.

In this process, the signal lights and the probe light 121, partly being branched by the optical fiber coupler 23 connected to the output sections of the optical amplifier-repeaters 22, reach the wavelength-selective reflecting device 24. The wavelength-selective reflecting device 24 reflects only the probe light 121. The reflected probe light 121 is transmitted by the optical fiber coupler 23 in the reverse direction, passes the optical fiber coupler 27, and is coupled with the down link. The probe light 121 outputted to the down link, after being transmitted by the optical transmission path, enters into the optical transmission path monitoring apparatus 1.

The probe light 121, having entered into the optical transmission path monitoring apparatus 1, is received by the direct detection type optical receiver 16 selected by the optical switch 17. In the direct detection type optical receiver 16, the probe light 121, after being cleared by the wavelength-variable optical filter 161 of any other light than the probe light 121, is photoelectrically converted by the optical receiver 162 (step S15). The electric signals resulting from the photoelectric conversion of the probe light 121 are amplified by the electrical amplifier 163 (step S16), and cleared of any noise content by the low pass filter 164 (step S17). The noise-cleared electric signals from the probe light 121 undergo computation by the signal processing section 18 (step S18), and positional information and output intensity information on the optical amplifier-repeaters having reflected the probe light 121 are displayed on the display section 19 (step S19).

Figure 11:
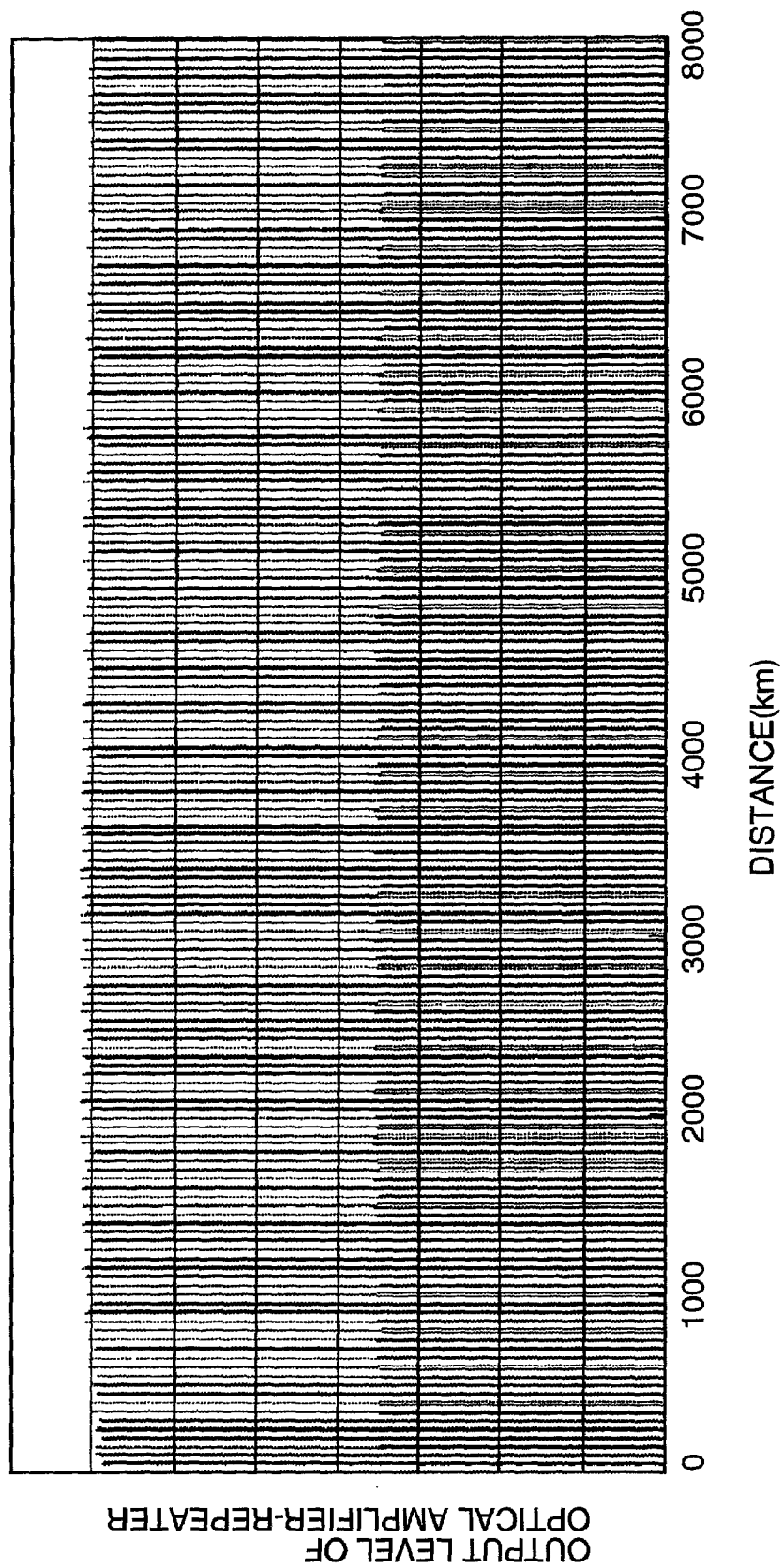
FIG. 11 is a diagram showing the result of optical amplifier-repeater monitoring according to the invention.

FIG. 11 shows the result of an optical amplifier-repeater monitoring experiment carried out with the embodiment of the invention at a signal light of 10 Gb/s bit-rate, 40 channels subjected to wavelength-division multiplexing over the full length of an optical transmission path in a system of 8000 km in transmission distance. This experiment was carried out in a state where signal lights were communicated, i.e. in an in-service state.

Peaks in the diagram correspond to the levels of reflected lights from the wavelength-selective reflecting device 24 correspond to the each output of the optical amplifier-repeaters 22, and they are proportional to the output levels of the respective optical amplifier-repeaters 22. The number of these peaks represents the number of optical amplifier-repeaters inserted over the distance of 8000 km.

It is seen that the peak levels in the diagram are substantially constant over the 8000 km span. This is because of the use of a directly detecting type receiver for the monitoring of the optical amplifier-repeaters, which virtually keeps this monitoring immune from the nonlinear optical effect, which did affect optical fiber monitoring, and accordingly makes possible stable measurement. This finding also demonstrates the presence of no optical amplifier-repeater whatsoever having suffered an output drop on the optical transmission path. It is because of the sufficiently large quantity of probe light reflection by the wavelength-selective reflecting device and the resultant high reception level of the optical receiver that the direct detection system can be applied to optical amplifier-repeater monitoring.

The reason why the wavelength of the probe light for monitoring the optical amplifiers is set to a long wavelength will be explained below. In an optical transmission system, conceivable reasons for a drop in the output of any operating optical amplifier-repeater mainly include a fault in the optical amplifier-repeater including the exciting light source and an increased loss in the preceding optical fiber. An output drop of an optical amplifier-repeater can substantially vary with the wavelength. In order to detect output fluctuations of optical amplifier-repeaters with high sensitivity, it is essential to set the probe light wavelength to a level where the output varies greatly.

Figure 12:
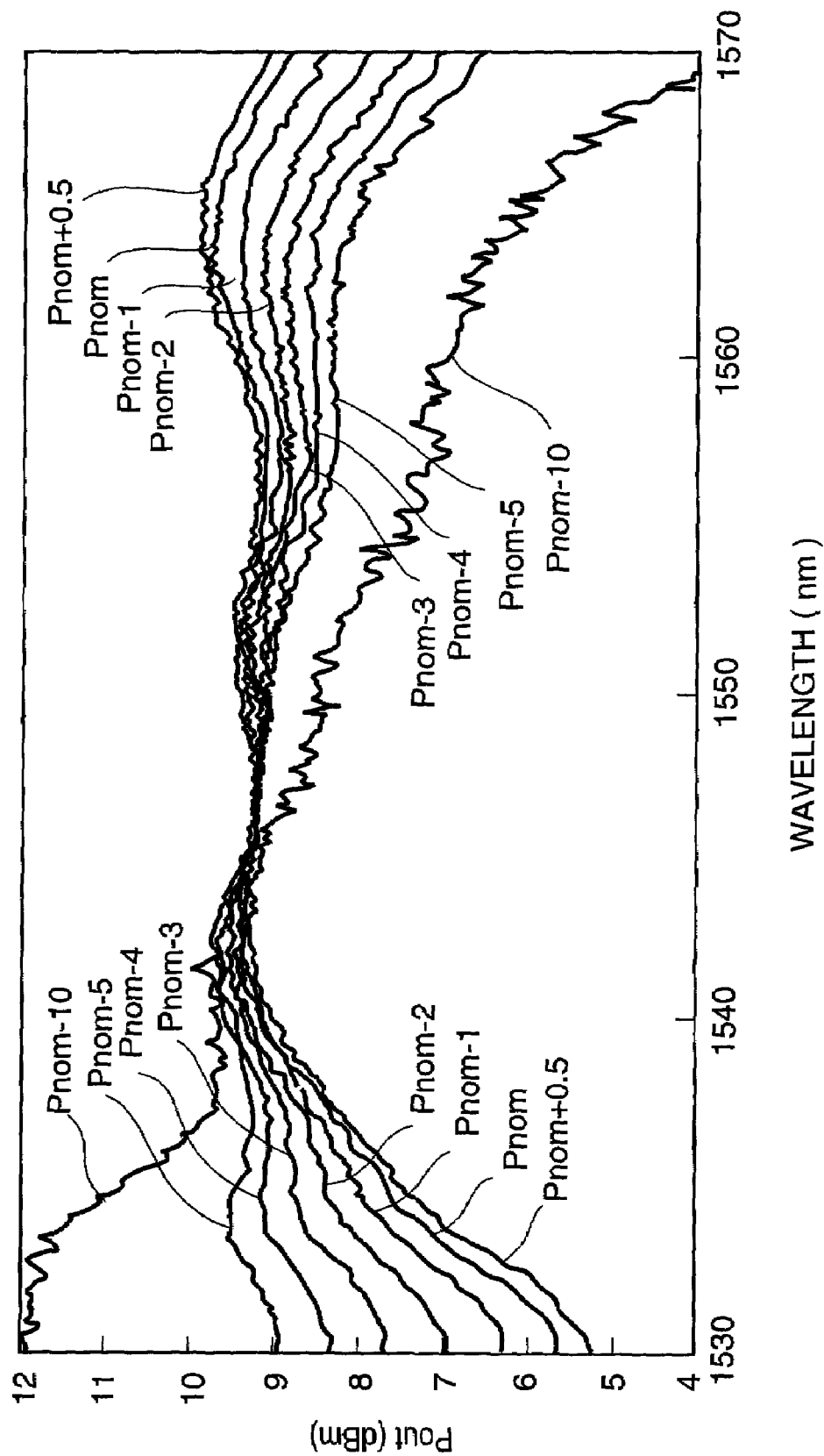
FIG. 12 is a diagram showing variations in the wavelength of the output optical power relative to the input power to optical amplifier-repeaters.

FIG. 12 shows the result of measurement of variations in the optical amplifier-repeater output relative to the wavelength when the signal light power input to the optical amplifier-repeater was varied. In FIG. 12, "Pnom" denotes the standard level of the signal light input power, "Pnom −10", a level 10 dB lower, and "Pnom +0.5", a 0.5 dB higher than the standard level. The same applies correspondingly to other signs.

It is seen that, as the signal light power input to the optical amplifier-repeater falls, gains on the longer wavelength side than the signal light wavelength of 1545 nm decrease, and gains on the shorter wavelength increase.

Usually, a wavelength division multiplexing optical transmission system utilizing the C band uses signal light wavelengths in the range of 1535 nm to 1565 nm. For this reason, if the wavelength of the probe light 12 for optical amplifier-repeater monitoring is set in the vicinity of 1545 nm, any drop in the power of signal light input to the optical amplifier-repeater 22 hardly entails a variation in the output to the probe light 12, making it difficult to detect its variation. Therefore, it is evidently preferable to set the wavelength of the probe light 12 longer than 1550 nm, at which the sensitivity of detecting variations in input power is particularly high.

By comparing the result of optical fiber monitoring according to the invention shown in FIG. 7B and that of optical amplifier-repeater according to the invention shown in FIG. 10, the system operator can identify the position of fault and determine whether the fault is attributable to any optical fiber or any optical amplifier-repeater.

As hitherto described, according to the present invention, effective monitoring is made possible because optical fibers and optical amplifier-repeaters, which are main elements constituting WDM optical transmission paths, are monitored with OTDR probe lights differentiated in wavelength in consideration of the characteristics of the transmission path. Thus, by allocating to the OTDR probe light for optical fiber monitoring such a wavelength as makes the wavelength dispersion over the optical transmission path negative (usually the shorter wavelength side than the zero dispersion wavelength of the optical transmission path), monitoring relatively immune from the effect of nonlinear deterioration is made possible.

Further by allocating to the OTDR probe light for optical amplifier-repeater monitoring a longer wavelength than 1550 nm, output fluctuations in repeater output can be monitored with high sensitivity.

For a transmission path whose dispersion slope is reverse to that shown in FIG. 4, the wavelength of the probe light can be set on the longer wavelength side than the zero dispersion wavelength. For the monitoring of optical amplifier-repeaters on a transmission path whose output fluctuations manifest a trend reverse to that shown in FIG. 11, the wavelength of the probe light can be set on the shorter wavelength side.

The OTDR for optical fiber monitoring, as it is provided with an optical receiver section based on the optical homodyne detection system, can enhance the accuracy of detection even in a directly amplifying optical transmission path having optical amplifier-repeaters connected in multiple stages, resulting in accurate monitoring of optical fibers.

The OTDR for optical amplifier-repeater monitoring, as it is provided with an optical receiver section based on the direct detection system, can carry out effective monitoring unaffected by either polarization variations or the impact of phase noise to which the probe light is subjected by cross phase modulation (XPM).

By differentiating the wavelength of the probe light between up and down links, there is provided the advantage of being able to monitor the transmission in two directions at the same time. By setting signal lights in a band where the amplifier can accomplish amplification efficiently and setting the monitoring signal lights outside the band of the signal lights, the impact on the transmission characteristics of the signal lights can be suppressed, also resulting in the advantage of making possible measurement in the in-service (signal operating) state.

While the present invention has been described in terms of a certain preferred embodiment, it is to be understood that the subject matter encompassed by the present invention is not limited to this specific embodiment. Instead, it is intended to include all such alternatives, modifications and equivalents as can be included within the spirit and scope of the following claims.

What is claimed is:

1. An optical transmission path monitoring system for monitoring optical transmission paths by wavelength-division multiplexing probe lights with signal lights of a wavelength division multiplexing optical transmission system, said optical transmission path monitoring system comprising:

an optical fiber monitoring probe light for monitoring optical fibers which constitute some parts of said optical transmission paths; and an optical amplifier-repeater monitoring probe light for monitoring optical amplifier-repeaters which constitute other parts of said optical transmission paths, wherein a wavelength of said optical fiber monitoring probe light comprises such a wavelength as makes wavelength dispersion in said optical transmission paths negative, and a wavelength of said optical amplifier-repeater monitoring probe light comprises such a wavelength as makes wavelength dispersion in said optical transmission paths positive.

2. The optical transmission path monitoring system, as claimed in claim 1, wherein:
said optical transmission paths have a zero dispersion wavelength which makes a wavelength dispersion of group delays over a full length of said optical transmission paths zero;
a wavelength of said optical fiber monitoring probe light is on a shorter wavelength side than said zero dispersion wavelength; and
a wavelength of said optical amplifier-repeater monitoring probe light is on a longer wavelength side than said zero dispersion wavelength.

3. The optical transmission path monitoring system, as claimed in claim 1, wherein:
said wavelength division multiplexing optical transmission system comprises two-core two-way optical transmission paths, and comprises a total of four probe lights including said optical fiber monitoring probe light and said optical amplifier-repeater monitoring probe light for delivering to each of two outward optical transmission paths which said two-core two-way optical transmission paths have; and
every one of said four probe lights has a different wavelength from the others.

4. The optical transmission path monitoring system, as claimed in claim 3, further comprising:
probe light generating means for generating said optical fiber monitoring probe lights and optical amplifier-repeater monitoring probe lights;
multiplexing means for multiplexing said probe lights with signal lights and delivering multiplexed lights to an outward optical transmission path;
loop back means for branching reflected light components generating from said probe lights from said outward optical transmission path and coupling the branched lights with signal lights on an inward optical transmission path; and
optical detecting means for detecting said light components transmitted by said loop back means and outputted from said inward optical transmission path, wherein:
said optical transmission paths are monitored on a basis of an output of said optical detecting means.

5. The optical transmission path monitoring system, as claimed in claim 4, wherein:
said optical detecting means optically detects by a coherent light detecting system said light components transmitted by said loop back means and outputted from said inward optical transmission path.

6. The optical transmission path monitoring system, as claimed in claim 5, wherein:
said coherent light detecting system comprises an optical homodyne detection system using said optical fiber monitoring probe light from said inward optical transmission path as a received light and a light partially branched from said optical fiber monitoring probe light from said probe light generating means as a local oscillating light.

7. The optical transmission path monitoring system, as claimed in claim 4, wherein:
said optical detecting means optically detects by a direct light detecting system said light components transmitted by said loop back means and outputted from said inward optical transmission path.

8. The optical transmission path monitoring system, as claimed in claim 4, wherein:
said loop back means comprises two 2×2 optical couplers inserted into said optical transmission paths and mutually connected by one each of optical terminals.

9. The optical transmission path monitoring system, as claimed in claim 8, wherein:
said 2×2 optical couplers comprise light reflecting means for selectively reflecting said optical amplifier-repeater monitoring probe lights.

10. The optical transmission path monitoring system, as claimed in claim 4, further comprising:
means for alternatively selecting said optical fiber monitoring probe lights and optical amplifier-repeater monitoring probe lights for supply to said outward optical transmission path, and monitoring the optical fibers and the optical amplifier-repeaters on a time-division basis.

11. An optical transmission path monitoring method for monitoring optical transmission paths by wavelength-division multiplexing probe lights with signal lights of a wavelength division multiplexing optical transmission system, said method comprising:
using an optical fiber monitoring probe light for monitoring optical fibers which constitute some parts of said optical transmission paths; and
using an optical amplifier-repeater monitoring probe light for monitoring optical amplifier-repeaters which constitute other parts of said optical transmission paths,
wherein a wavelength of said optical fiber monitoring probe light comprises such a wavelength as makes wavelength dispersion in said optical transmission paths negative, and a wavelength of said optical amplifier-repeater monitoring probe light comprises such a wavelength as makes wavelength dispersion in said optical transmission paths positive.

12. The optical transmission path monitoring method, as claimed in claim 11, wherein:
said optical transmission path has a zero dispersion wavelength which makes a wavelength dispersion of group delays over a full length of said optical transmission paths zero;
a wavelength of said optical fiber monitoring probe light is on a shorter wavelength side than said zero dispersion wavelength; and
a wavelength of said optical amplifier-repeater monitoring probe light is on a longer wavelength side than said zero dispersion wavelength.

13. The optical transmission path monitoring method, as claimed in claim 11, wherein:
said wavelength division multiplexing optical transmission system comprises two-core two-way optical transmission paths, and comprises a total of four probe lights including said optical fiber monitoring probe light and said optical amplifier-repeater monitoring probe light for delivering to each of two outward optical transmission paths which said two-core two-way optical transmission paths include; and
every one of said four probe lights has a different wavelength from the others.

14. The optical transmission path monitoring method, as claimed in claim 13, said method comprising:
generating said optical fiber monitoring probe lights and optical amplifier-repeater monitoring probe lights;
multiplexing said probe lights with signal lights and delivering multiplexed lights to said outward optical transmission path; and
detecting said light components outputted from said inward optical transmission path by branching reflected light components generating from said probe lights from an outward optical transmission path and looping back branched lights onto an inward optical transmission path, whereby said optical transmission paths are monitored on a basis of an output of said optical detecting means.

15. The optical transmission path monitoring method, as claimed in claim 14, whereby:

light components outputted from said inward optical transmission path are detected by a coherent light detecting system during said detecting light components.

16. The optical transmission path monitoring method, as claimed in claim 15, whereby:

said coherent light detecting system comprises an optical homodyne detection system using said optical fiber monitoring probe light from said inward optical transmission path as a received light and a light partially branched from said optical fiber monitoring probe light generated from said probe light as a local oscillating light.

17. The optical transmission path monitoring method, as claimed in claim 14, whereby:

said light components transmitted by said looping back and outputted from said inward optical transmission path are detected by a direct light detecting system during said detecting light components.

18. The optical transmission path monitoring method, as claimed in claim 14, whereby:

said optical fiber monitoring probe lights and optical amplifier-repeater monitoring probe lights are alternatively selected for supply to said outward optical transmission path, and the optical fibers and the optical amplifier-repeaters are monitored on a time-division basis.

19. An optical monitoring apparatus for monitoring an optical transmission path, comprising:

a first probe light generating unit for emitting a first optical fiber monitoring probe light which monitors optical fibers constituting said optical transmissions path; and a second probe light generating unit for emitting a first optical amplifier-repeater monitoring probe light which monitors optical amplifier repeaters constituting said optical transmission path, wherein a wavelength of said first optical fiber monitoring probe light is such a wavelength as makes wavelength dispersion in said optical transmission paths negative, and a wavelength of said first optical amplifier-repeater monitoring probe light is such a wavelength as makes wavelength dispersion in said optical transmission paths positive.

20. The optical monitoring apparatus as claimed in claim 19, further comprising:

a first probe light detecting unit for detecting a second optical fiber monitoring probe light which monitors said optical fibers; and a second probe light detecting unit for detecting a second optical amplifier-repeater monitoring probe light which monitors said optical amplifier repeaters, wherein a wavelength of said second optical fiber monitoring probe light is such a wavelength as makes wavelength dispersion in said optical transmission paths negative, and a wavelength of said second optical amplifier-repeater monitoring probe light is such a wavelength as makes wavelength dispersion in said optical transmission paths positive.

21. The optical monitoring apparatus as claimed in claim 20, wherein:

the wavelength of said first optical fiber monitoring probe light differs from the wavelength of said second optical fiber monitoring probe light; and the wavelength of said first optical amplifier-repeater monitoring probe light differs from the wavelength of said second optical amplifier-repeater monitoring probe light.

22. The optical monitoring apparatus as claimed in claim 20, further comprising:

an optical coupling unit for coupling said first optical fiber monitoring probe light and first optical amplifier-repeater monitoring probe light; and an optical switching unit for changing connections with said optical transmission path to said first probe light detecting unit or said second probe light detecting unit.

23. The optical monitoring apparatus as claimed in claim 19, wherein:

the wavelengths of said first optical fiber monitoring probe light is an a shorter wavelength side than a zero dispersion wavelength which makes a wavelength dispersion in said optical transmission path zero; and the wavelength of said first optical amplifier-repeater monitoring probe light is on a longer wavelength side than said zero dispersion wavelength.

24. The optical monitoring apparatus as claimed in claim 20, wherein:

the wavelength of said second optical fiber monitoring probe light is on a shorter wavelength side than a zero dispersion wavelength which makes a wavelength dispersion in said optical transmission path zero; and the wavelengths of said second optical amplifier-repeater monitoring probe light is on a longer wavelength side than said zero dispersion wavelength.

25. The optical monitoring apparatus as claimed in claim 20, wherein:

said first probe light detecting unit optically detects by an optical homodyne detecting system.

26. The optical monitoring apparatus as claimed in claim 20, wherein:

said second probe light detecting unit optically detects by a direct light detecting system.

* * * * *